MULTI-BAND COMPENSATED OSCILLATOR

Filed May 13, 1954

Inventors
Arthur H. Maciszewski
Julius J. Hupert
Richard Goldstein
Tadeusz Szubski
by Moore, Frangley & Clayton Attys.

MULTI-BAND COMPENSATED OSCILLATOR

Inventors
Arthur H. Maciszewski
Julius J. Hupert
Richard Goldstein
Tadeusz Szubski
by Moore, Prangley + Clayton Attys.

MULTI-BAND COMPENSATED OSCILLATOR

Filed May 13, 1954 4 Sheets-Sheet 3

Inventors
Arthur H. Maciszewski
Julius J. Hupert
Richard Goldstein
Tadeusz Szubski
by Moore, Prangley + Clayton Attys.

MULTI-BAND COMPENSATED OSCILLATOR

Filed May 13, 1954 4 Sheets-Sheet 4

Inventors
Arthur H. Maciszewski
Julius J. Hupert
Richard Goldstein
Tadeusz Szubski
by Moore, Prangley & Clayton Attys.

2,881,315

MULTI-BAND COMPENSATED OSCILLATOR

Arthur H. Maciszewski, Julius J. Hupert, Richard Goldstein, and Tadeusz Szubski, River Forest, Ill., assignors to A.R.F. Products, Inc., River Forest, Ill., a corporation of Illinois Application May 13, 1954, Serial No. 429,547

9 Claims. (Cl. 250—36)

This invention relates to signal generators and circuits therefor and particularly to calibrated signal generators and circuits therefor useful in testing electronic equipment.

One of the principal uses of electronic equipment made according to the present invention is the production of a radio frequency signal having a known and well regulated frequency. Two common sources of error or causes of deviation in the frequency of such radio frequency sources are changes in temperature and variations in the A.C. line voltage which supplies the power for the various power connections to the oscillator and associated circuits.

Accordingly, it is an important object of this invention to provide an improved means for compensating circuit changes caused by changes in temperature and particularly to an improved circuit for stabilizing the frequency of capacity tuned radio frequency oscillators.

In connection with the foregoing object, it is a further object of this invention to provide in such radio frequency oscillators complete two-point compensation of the frequency-temperature characteristic of the oscillator so that proper compensation is obtained in both low and high frequencies.

The variation in frequency of a radio frequency oscillator which is caused by variations in the A.C. power supply voltage is most noticeable when the radio frequency oscillator is connected in circuit with a reactor tube used in F.M. modulation.

Therefore it is another object of this invention to provide a circuit for stabilizing the frequency of R.F. oscillators against the variations in A.C. line voltage for the power supply when the radio frequency oscillator is concented in a F.M. oscillator-reactor circuit.

In connection with the foregoing object it is a further object of this invention to provide means for stabilizing the frequency of such radio frequency oscillators when the oscillator includes a non-regulated or partially regulated heater supply for biasing current in the cathode circuit of the oscillator.

The apparatus of the present invention includes a radio frequency oscillator whose frequency is continuously variable over a definite range of finite extent. The frequency of this oscillator, which can be called the variable oscillator, is checked and calibrated against the output of a calibration oscillator. The calibration oscillator operates at a fixed predetermined frequency such for example as two megacycles. The output of the calibration oscillator is amplified in such a manner as to generate harmonics of the fundamental frequency of the calibration oscillator so that calibrated signals can be obtained at regular intervals throughout the frequency range of the variable oscillator. In commercial devices it is desirable to have calibration signals available at one megacycle interval at least in the lower half of the frequency range of the variable oscillator. Greater stability and accuracy of the calibration signals are obtained if the fundamental frequency of the calibration oscillator is some multiple of one megacycle.

Accordingly, it is still another object of the present invention to provide a system wherein, for example, one megacycle calibration signals can be produced when, for example, a two megacycle fundamental reference frequency is generated by the calibration oscillator whereby a smaller number of harmonics of the fundamental reference frequency may be used to achieve a given range of calibration.

In connection with the foregoing objects it is still another object to provide a system of the type set forth in which calibration signals are obtained at one megacycle intervals in the lower half of the predetermined frequency range of the variable oscillator and the space between calibration signals in the upper half of the range of the variable oscillator is two megacycles thereby giving a greater spread between the calibration signals at the upper end of the frequency spectrum where small movements of the calibrating dials effect relatively large changes in frequency.

Yet another object of the invention is to provide an improved radio frequency output attenuator which is responsive only to the voltage induced by the inductive coupling mode and in which the couplng can be adjusted.

In connection with the foregoing object it is a still further object to provide an attenuator in which there is practically no mistuning of the principal radio frequency tank circuit due to the degree of coupling thereto by the attenuator.

A further object of the invention is to provide a frequency modulated oscillator-reactor circuit whose deviation sensitivity is not affected appreciably by changes in the value of the carrier frequency.

A still further object of the invention is to provide an output circuit which operates at a fixed or stepwise adjustable frequency and incorporating proper impedance matching consistent with reasonable harmonic rejection.

These and other objects and advantages of the invention are achieved by the signal generator illustrated in the accompanying drawings. In the drawings wherein like reference numerals have been used to designate like parts throughout:

Figures 1, 2:
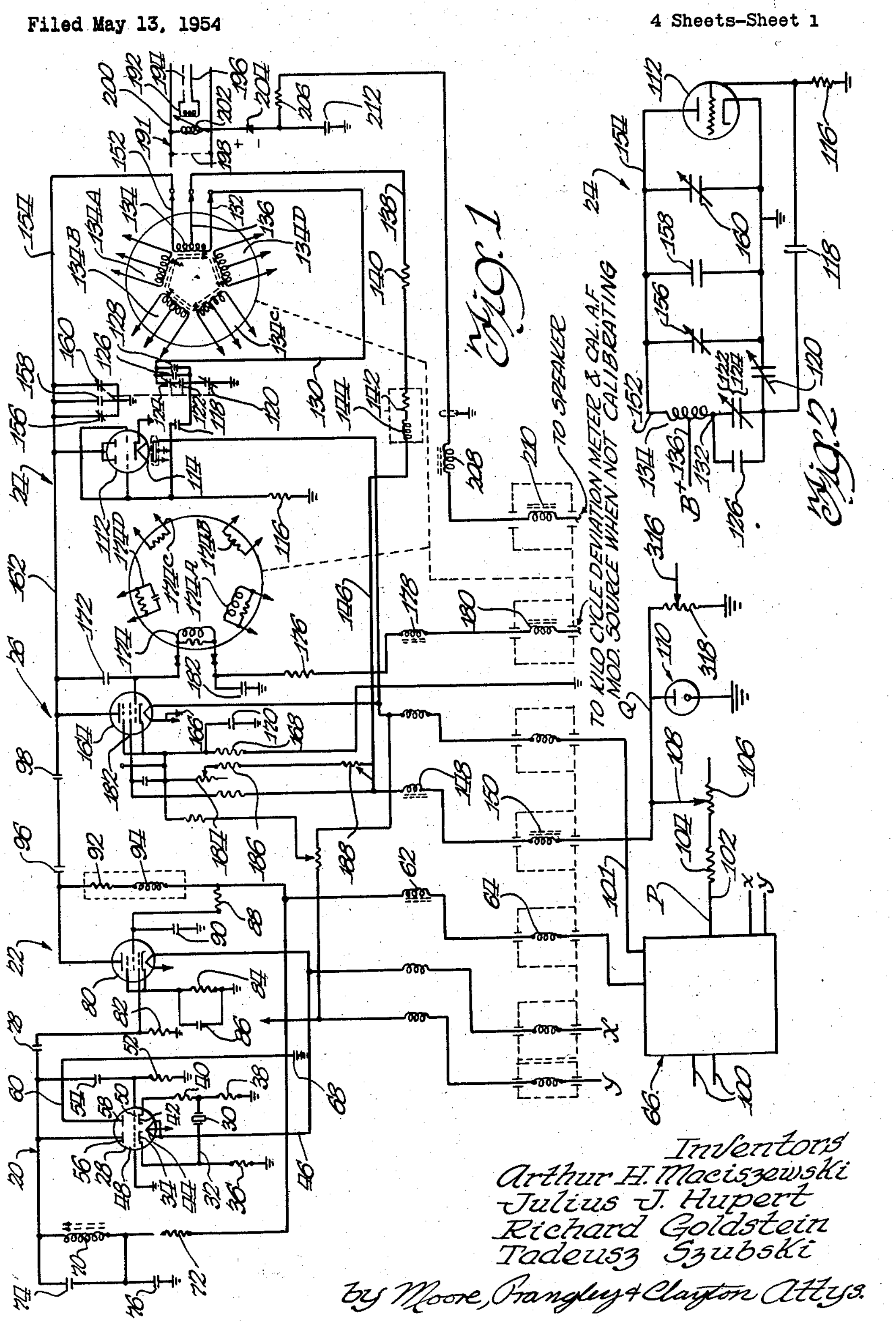
Fig. 1 is a circuit diagram, part diagrammatic, of the variable radio frequency oscillator of this invention and its connection with the reactor tube, the calibration oscillator, and the radio frequency output attenuator.
Fig. 2 is a simplified circuit diagram of the temperature compensating circuit for stabilizing the frequency of the variable radio frequency oscillator.

Referring now to the drawings and particularly to Fig. 1 there is shown the calibrated radio frequency section of the signal generator made according to and incorporating the principles of the present invention. The calibrated radio frequency section of the signal generator comprises generally a calibrating oscillator 20, a harmonic generator and amplifier 22, a variable radio frequency oscillator 24 and a modulating or reactor tube circuit 26. In general the purpose of the calibrating oscillator is to generate an accurate radio frequency operating at a given fundamental frequency such as, for example, two megacycles, this frequency being calibrated and controlled to a high degree of accuracy. The output of the calibrating oscillator 20 is then fed to the harmonic generator and amplifier 22 which generates harmonics of the fundamental frequency of two megacycles and amplifies these harmonic frequencies as well as the fundamental frequency to provide calibrating reference signals.

The oscillator 24 is continually variable over a specified range and as illustrated has five separate ranges over which the frequency is continually variable. It is oscillator 24 which will provide the working signal to be used in testing and calibrating other electronic equipment. The output of the variable radio frequency oscillator 24 and the output of the harmonic amplifier 22 are each fed to the reactor tube circuit 26 and there beat against each other. The output of the reactor tube circuit 26 is fed to a deviation meter or to a speaker so that the difference between the variable oscillator frequency and the appropriate calibrating signal can be detected and adjusted to zero at which the time the frequency of the variable oscillator 24 can be said to be calibrated.

Each element of the above radio frequency generating and calibrating circuit will now be discussed in detail.

Referring first to the calibrating oscillator 20, this oscillator includes a duo-triode 28 whose operation is controlled by a crystal 30. Although any suitable frequency of crystal 30 may be utilized, a crystal operating at a frequency of two megacycles is preferred. A crystal operating at two megacycles permits one megacycle beat nulls to be generated with the use of a minimum of harmonics of the fundamental operating frequency of crystal 30 as will be explained in full hereinafter. One of the terminals of crystal 30 is connected through a lead 32 to one of the cathodes 34 of tube 28 which is preferably a type 12AU7, and through a resistor 36 (820 ohms) to ground. The other terminal of crystal 30 is connected through a resistor 38 (820 ohms) to ground and through a resistor 40 (820 ohms) to the other cathode 42 of tube 28. The cathodes 34 and 42 are heated by heaters 44 that are supplied with suitable power through line 46. One of the control grids 48 is grounded and the other control grid 50 is connected through a resistor 52 (4700 ohms) to ground and through a capacitor 54 (470 μμf.) to one of the plates 56 of tube 28. The other plate 58 of tube 28 is connected through a line 60, an inductance 62 (0.9 μh.) and a shielded inductance 64 (0.9 μh.) to a source 66 of high operating potential. A capacitor 68 (5000 μμf.) is connected from plate 58 to ground to filter out and prevent radio frequency oscillations from entering the power supply 66. Plate 56 is connected through a variable inductance 70 and a resistor 72 (1000 ohms) to line 60 whereby to provide a source of high operating potential for plate 56. There is provided in parallel with inductor 70 a capacitor 74 (150 μμf.) and the junction between inductance 70 and resistor 72 is connected to ground by another capacitor 76 (5000 μμf.).

The above described circuit operates as a radio frequency oscillator at two megacycles when inductor 70 is properly adjusted to produce a resonant circuit at two megacycles.

The output from the calibration oscillator 20 is fed through a coupling capacitor 78 (470 μμf.) from plate 56 to the first grid of a tube 80 which serves as the harmonic generator and amplifier for circuit 22. Tube 80 is preferably a pentode and may be for example a 6AH6 or any other pentode having similar characteristics. The input signal on the control grid of tube 80 is developed across resistor 82 connected from the grid to ground, this resistor having a value of 47000 ohms. The third or suppressor grid of tube 80 is connected directly to the cathode and the cathode is provided with self bias through a resistor 84 (220 ohms) which is connected to ground and which has in parallel therewith a capacitor 86 (5000 μμf.). The second or screen grid is connected through a resistor 88 (47000 ohms) to a source of operating potential through inductors 62 and 64 and is bypassed to ground by a capacitor 90 (5000 μμf.). The plate of tube 80 is connected through a resistor 92 in series with an inductor 94 which in turn is connected to a source of operating potential through an inductance 62 and 64. Resistor 92 preferably has a value of 400 ohms and inductor 94 is so chosen that the amplifier 92 has a by-pass from two megacycles to and through 28 megacycles but has a relatively sharp cut-off between 28 megacycles and 30 megacycles. This is assuming that the operating range of the variable frequency oscillator 24 is to be in the range from zero megacycles up to and including 28 megacycles. If the range of the variable frequency oscillator 26 is to be greater or less, the values of resistor 92 and inductor 94 are chosen accordingly. The sharp cut-off characteristics of these circuit elements serve a purpose which will be more fully described later in this specification when discussing the calibration of oscillator 24.

The output from amplifier 22 will consist of an accurately controlled signal at two megacycles and the harmonics thereof up to and through the 14th harmonic which corresponds to 28 megacycles. The 15th harmonic and higher harmonics will be suppressed for reasons which will be more apparent hereinafter. The output of the amplifier 22 is fed through a pair of series coupling capacitors 96 (10 μμf.) and 98 (1 μμf.) to the plate of the tube in reactor circuit 26.

All of the operating potential of the tubes 28 and 80 and for the tubes in the oscillator circuit 24 and the reactor circuit 26 are supplied from the power supply or source generally designated by the numeral 66. The power supplied to power supply 66 is the usual 110 volts 60 cycle A.C. current which is supplied through a pair of lines 100 which will be hereafter referred to as the main supply line. The power supply 66, which is illustrated diagrammatically in Fig. 1, includes suitable transformers and rectifiers. One of the outputs of the power supply 66 is a non-regulated 6.3 volt heater supply, the terminals of which are indicated by the numerals "X" and "Y" and are the source of current for the cathode heaters described above. The inductor 64 is connected to an unregulated voltage point within power supply 66 for supplying relatively high operating potentials to the plates and grids of tubes 28 and 80. Another output from power supply 66 is a 6.7 volt heater supply 101 which is used to heat the filaments of the tubes in oscillator circuit 24 and reactor circuit 26.

One of the principal outputs of power supply 66 is an unregulated voltage appearing on line 102. Line 102 is connected to a resistor 104 (1600 ohms) which is in turn connected to a variable resistance 106 (1000 ohms). The movable arm 108 on the variable resistance 106 is connected to the plate of a voltage regulator tube 110 which may be of the type designated OA2. The voltage appearing on arm 108 serves as a regulated voltage supply for use on certain of the grids and the plates in the tubes of circuits 24 and 26.

The variable radio frequency oscillator 24 utilizes a duo-triode 112 which may be of the type designated 6J6. The cathode of tube 112 is heated by a filament 114 which is supplied with power from the low voltage supply 101. The cathode is grounded; the two control grids are connected to each other and the two plates are connected to each other. The grids are also connected to ground through a resistor 116 (33000 ohms) and to a capacitor network which forms one of the tuning elements of the oscillator tank. More specifically the grids are connected to a capacitor 118 (82 $\mu\mu$f.) which is in turn connected to a grounded variable capacitor 120 (12.4–77.6 $\mu\mu$f.), to a pair of variable capacitors 122 and 124 (having a combined capacitance of 8.0 to 66.8 $\mu\mu$f.), a capacitor 126 (2.1 $\mu\mu$f.) in parallel with capacitors 122 and 124, and a two section capacitor 128 (2.1 to 5.3 $\mu\mu$f. per section) which is in parallel with capacitor 126. The upper ends of capacitors 124 and 126 and 128 are connected to each other and through a line 130 to one terminal 132 of a variable inductance 134 which forms a portion of the tuned circuit of the oscillator 24. The oscillator circuit 24 has five separate ranges and accordingly five separate coils 134 having identical connections but different circuit values are provided. The center terminal 136 of coil 134 is connected through a line 138 to a resistor 140 (47 ohms) which is in turn connected to a resistance 142 (400 ohms) in series with an inductance 144. Inductance 144 is connected through a line 146, inductance 148 (14 $\mu$h.) and an inductance 150 (14 $\mu$h.) to the arm 108 on which appears the regulated high potential power supply.

The other terminal 152 of coil 134 is connected through a line 154 to the plate of tube 112 and accordingly the plate of tube 112 receives D.C. potential through the coil 134. The plate of tube 112 is also connected to ground through a series of three parallel capacitors, namely a variable capacitor 156 (1.7–8.7 $\mu\mu$f.), a fixed capacitor 158 (10 $\mu\mu$f.) and another variable capacitor 160 (9.2–17.2 $\mu\mu$f.).

Capacitors 120, 121 and 160 are ganged together for a purpose which will be more apparent hereinafter. The described circuit 24 is operable to produce a continually variable frequency over a given range, there being several different individual ranges. More particularly each coil 134 is adjustable to provide a continually varying frequency over a given specified range for the particular coil 134.

The output from the variable oscillator 24 is taken from the plate through a line 162 to the plate of a tube 164 in the reactor circuit 26. Tube 164 is preferably a 6AH6 pentode.

The cathode of tube 164 is heated by a filament 166 which is supplied with potential from the low voltage filament supply line 101. The third grid of the tube is connected directly to the cathode and the cathode is in turn connected to ground through a resistance 168 (100 ohms). Cathode bias is provided for tube 164 by providing resistance 168 with a by-pass capacitor 170 (800 $\mu\mu$f.).

The control grid of tube 164 is connected through a capacitor 172 (10 $\mu\mu$f.) to the plate of tube 164 and to the plate of tube 112 in the variable oscillator. The control grid of tube 164 is also connected to a suitable R.L. a purpose which will be more apparent hereinafter. The circuit generally designated by the numeral 174 which is in turn connected to a resistor 176 (470 ohms). Resistor 176 is connected to an inductance 178 (14 $\mu$h.) and an inductance 180 (14 $\mu$h.) to a kilocycle deviation meter when calibrating and to a source of AF modulating voltage when desired. One end of resistance 176 is connected to ground through a capacitance 182 (470 $\mu\mu$f.).

Instead of the RL circuit 174, an RL circuit 174A, a resistance 174B, a resistance 174C, and a R.C. circuit 174D are provided for use on difference frequency ranges. The various circuit elements 174—174D are ganged to the coils 134—134D so that these elements are automatically switched in both circuits when the frequency of oscillator frequency circuit 124 is changed.

Referring now to Fig. 2 there is shown a simplified wiring diagram of certain portions of the variable oscillator 24, the details of which are shown in Fig. 1 described above. The simplified schematic drawing of Fig. 2 will be utilized to explain the manner in which compensation for temperature variations are made in the new improved circuit.

Usually the frequency determining circuit elements such as inductance 134, capacitors 122—124, and capacitors 120 and 160 have a positive thermal coefficient thereby causing a negative frequency coefficient. This positive thermal or temperature coefficient of the various frequency determining elements is counteracted in the present circuit by incorporating therein two capacitors having negative temperature coefficients. These added capacitors having negative temperature coefficients are capacitors 126 and 158. It will be seen from Fig. 2 that the contribution of capacitor 126 towards compensating for thermal deviations is highest at the higher operating frequencies. Conversely the contribution of capacitor 158 toward correcting temperature deviation is greatest at the low operating frequencies. Accordingly capacitors 126 and 158 are effective to provide adequate negative temperature coefficient contributions at both the high and low ends of the operating frequency range.

Capacitors 126 and 158 are preferably of a type using a ceramic dielectric, the dielectric material being chosen so that the capacitor has a negative temperature coefficient. In certain instances it may be found that the frequency contributing components of an oscillator circuit have a negative temperature coefficient. In such cases capacitors 126 and 158 would be chosen to provide positive temperature coefficient contributions.

Figure 3:
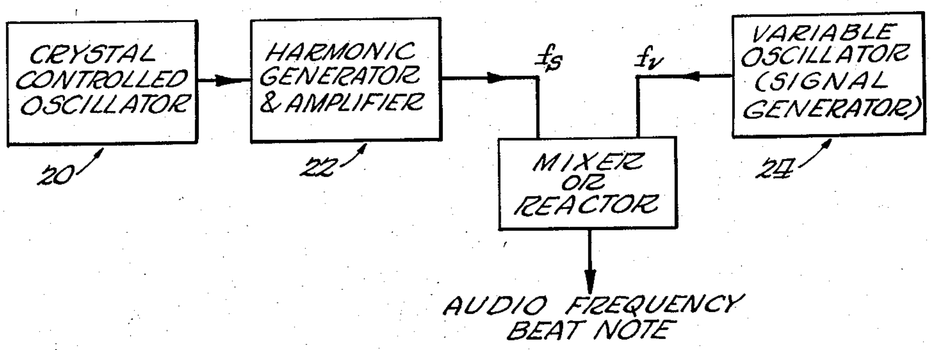
Fig. 3 is a block diagram illustrating the calibration system for calibrating the variable radio frequency oscillator by means of the calibration oscillator shown in Fig. 1.

Referring now to Figs. 3 to 6 of the drawings, the new improved calibration system of the present invention will be described in detail. In Fig. 3 a block diagram is utilized to illustrate the fact that the crystal controlled oscillator 20 has its output fed to a harmonic generator and amplifier 22 which produces a plurality of calibration signals $f_s$. In the example of Fig. 1 the fundamental frequency of the signals $f_s$ is two megacycles and there is a signal at each two megacycle interval up to and including a 28 megacycle signal. All harmonics of two megacycles above 28 megacycles are suppressed by the circuit elements 92 and 94 in Fig. 1. These figures are based on the assumption that the output of the variable oscillator 24 is to be confined in the range of from zero to 28 megacycles. The output voltage, $f_v$ of the variable oscillator 24 is therefore always within the range of zero to 28 megacycles.

The two signals $f_s$ and $f_v$ are fed into the reactor 26 where they are beat against each other and the difference frequency, which is an audio frequency when $f_s$ and $f_v$ are nearly identical, appears as a beat note in earphones, on a deviation meter or in a loud speaker as desired. When no beat note is present or in other words when a calibration beat null is obtained, $f_v$ can be said to be calibrated by $f_s$.

Figure 4:
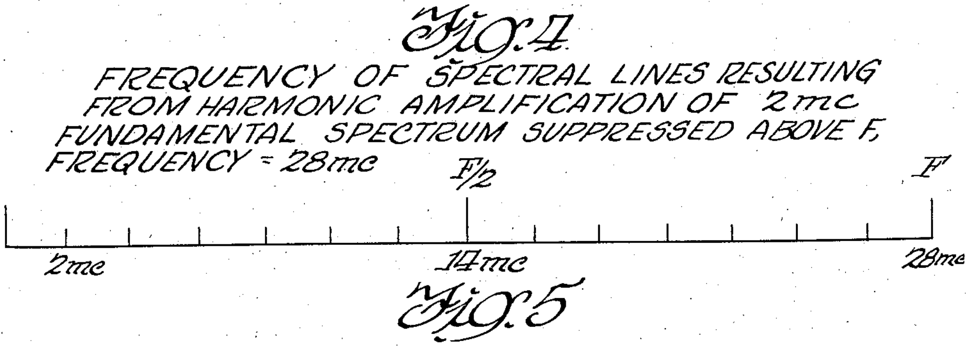
Fig. 4 is a chart showing the distribution of the frequencies of the spectral lines resulting from harmonic amplification of the fundamental frequency at which the calibration oscillator operates and illustrating the fact that the spectrum is suppressed above a frequency, F, which designates the upper limit of the range of operation of the variable radio frequency oscillator.

Fig. 4 illustrates the extent and disposition of the calibrating signals which are derived from the harmonic generator and amplifier 22. The frequency designated by the letter F represents the highest frequency which is to be obtained from variable oscillator 24 and in the illustrative example is equal to 28 megacycles. The signal $f_s$ has a component at each two megacycle interval beginning with a two megacycle signal up to and including a signal at 28 megacycles. All signals above 28 megacycles are suppressed.

Figure 5:
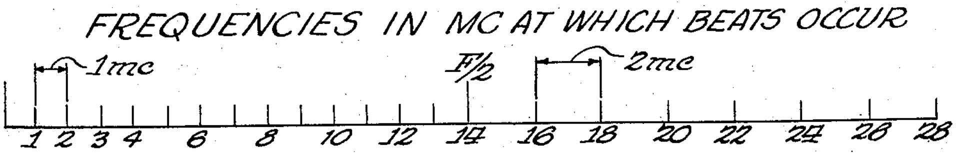
Fig. 5 is a chart illustrating the frequencies at which calibration beat nulls are obtained within the frequency range of the variable oscillator when the output of the variable oscillator is beat against the output of the harmonic amplifier of the calibrated oscillator.

The graph in Fig. 5 illustrates the points in the frequency spectrum from zero to 28 megacycles at which calibrating beat nulls are obtained when the output from generator 22, $f_s$, is beat against the output from the variable oscillator 24, $f_v$, in the mixer stage 26. It will be seen that a calibrating beat null is obtained at each one megacycle position from zero through 14 megacycles and that a calibrating beat null is obtained at two megacycle intervals beginning with a frequency equal to 14 megacycles. No beats appear above 28 megacycles.

The calibrating beat nulls at the even numbered megacycle position, that is at 2, 4, 6, 8 etc. megacycles are obtained in the normal manner by directly beating the fundamental of the frequency, $f_v$, against one of the calibrating signals $f_s$ illustrated in Fig. 4.

Figure 6:
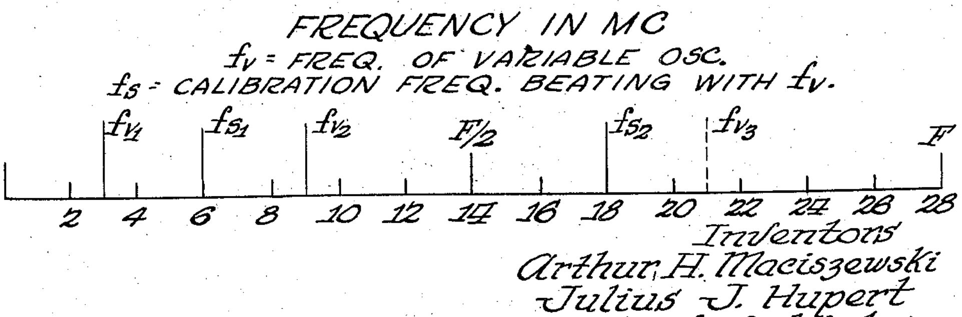
Fig. 6 is a chart illustrating the manner in which calibrated beat nulls are obtained at odd megacycle positions in the lower half of the frequency range of the variable oscillator and why no calibrated beat nulls are obtained in the upper half of the range of the variable radio frequency oscillator.

By referring to Fig. 6 the manner in which calibrating beat nulls are obtained at the odd numbered megacycle points, such as at one megacycle, 3 megacycles, etc. in the range from one megacycles to 13 megacycles will be explained. For example when the frequency $f_v$ equals 3 megacycles (the point indicated by the designation $f_{v1}$ in Fig. 6) the second harmonic of $f_{v1}$, i.e., a 6 megacycle signal, is beat against the 6 megacycle calibrating signal designated by the character $f_{s1}$ in Fig. 6. Thus by beating the second harmonic of the variable oscillator signal against a calibrating signal higher in the spectrum, calibrating beat nulls can be obtained at the odd megacycle positions. By way of further illustration, a signal $f_{v2}$ having a value of 9 megacycles which is generated by the variable oscillator 24 will produce a calibrating beat null by beating the second harmonic thereof of 18 megacycles against the calibrating signal $f_{s2}$ at 18 megacycles.

The above described method of obtained calibrating beat signals at the odd numbered megacycle positions is effective up to and including a signal at 13 megacycles. There is no calibrating beat signal at 15 megacycles or higher odd numbered megacycle positions since the calibrating signals $f_s$ are suppressed above the frequency, F, or 28 megacycles. If it is attempted to obtain a calibrating beat null at for example $f_{v3}$ equals 21 megacycles, no beat null would be achieved since the second harmonic of $f_{v3}$ is 42 megacycles and there is no calibrating signal $f_s$ at 42 megacycles against which to beat this second harmonic of the variable oscillator output. It will be seen therefor that there will be no calibrating beat nulls at the odd numbered megacycle positions above 14 megacycles.

The above calibrating arrangement has an important advantage since ordinary calibrating beat nulls are desirable at one megacycle intervals only at the low end of the spectrum. At the higher end of the spectrum it is actually a disadvantage to have calibrating signals at one megacycle intervals since the calibrating signals occur too frequently with a given change in setting of the dials controlling the output of the variable oscillator 24. In effect a spread in the calibrating signals is obtained in the upper half of the frequency spectrum from F/2 to F thus simplifying calibrating in this range and yet retaining one megacycle calibrating signals in the lower half of the range where there is a greater spread on the calibrating dials.

After the variable oscillator 24 has been calibrated, the high voltage supply to the plates of the oscillator stage 20 and the harmonic generator stage 22 is removed. One use of the output of the variable oscillator at this point is that of acting as an F.M. modulated source for use as a testing signal. One of the common causes of frequency deviation during modulation is a change in the main supply line voltage fed to the power supply 66 through lines 100 (see Fig. 1). The effect of varying line voltage on frequency is exerted primarily through the reactor tube 164 which is the most sensitive element in the modulating system as far as changes in operation voltages is concerned.

The reactance tube 164 contributes to the total reactance of the tuned circuit of oscillator 24 and, accordingly, it is desirable that the reactance exhibited by tube 164 not vary with changes in the main supply line voltage. The value of the reactance contributed to the tuned oscillator circuit 24 by reactor tube 164 depends, if other factors are equal, on the value of the transconductance of tube 164 corresponding to a given operation point of the tube. The transconductance value is known to depend primarily on the value of the plate current rather than on the values of the positive or negative bias applied to the various tube electrodes.

Accordingly, the present invention contemplates adjusting the degree of regulation of the voltage of the various electrodes with variations in the supply line voltage in a manner which will enable the plate current of tube 164 to remain substantially independent of variation in the other operating potentials. In the specific circuit illustrated, the heater circuit of tube 164 is not regulated at all and, accordingly, a drop in the voltage applied to line 100 causes the plate current to drop. However the decreasing automatic bias across the resistance 168 aids in restoring the value of the plate current provided the voltage on the screen grid 182 (the second grid) is regulated.

In order to carry out the above purposes the cathode of tube 164 is connected through a variable resistor 184 (10,000 ohms), a resistor 186 (3,300 ohms) and another variable resistor 188 (3,300 ohms) to the regulated high voltage supply controlled by regulator tube 110. The bias of tube 164 is controlled by the current flow through resistor 168 which in turn is composed of two components. One component of current through resistor 168 is the current flowing through tube 164 from the cathode to the plate and the other component of current is that flowing through the resistors 186, 184 and 188 to the regulated high voltage supply. The component of current through the resistors connected to the regulated high voltage supply would not be a function of the main supply line voltage due to the regulating action of tube 110. Accordingly any change in flow of current through the resistor 168 will depend upon changes in the plate voltage of tube 164 which voltage changes are changes in the main line voltage. The self biasing generated by resistor 168 will counteract any attempted changes in flow of current through tube 164 caused by changes in the plate voltage. Therefore the flow of current through tube 164 will remain relatively unchanged. The degree of regulation afforded by flow of current through resistor 186, 184 and 188 is controlled by the setting of arm 108 on resistor 106 and the magnitude of this flow of current is adjusted by means of resistors 184 and 188. The setting of these resistors is done experimentally by observation of the radio frequency value in a stabilized state for various values of main supply line voltage appearing on lines 100.

The above circuits will supply a frequency modulated radio frequency signal which can be used for calibrating and testing purposes. One important characteristic of the modulating process is called the "deviation sensitivity"

and is defined as the ratio of the F.M. deviation or change in frequency of the carrier which is obtained when an AF signal is applied to the audio frequency reactor grid voltage. In mathematical terms the deviation sensitivity can be represented as $$\frac{\Delta F}{V_{AF}}$$

It is desirable that the deviation sensitivity remain substantially constant within the frequency range of the variable oscillator 24. If no compensating circuit components are provided, the deviation sensitivity ordinarily increases with a decrease in oscillator frequency in accordance with the law of inverse proportionality.

Figure 13:
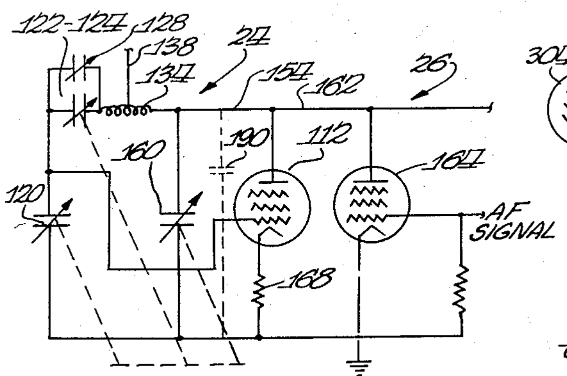
Fig. 13 is a simplified schematic diagram of the improved frequency modulation circuit having a constant deviation sensitivity which is shown in full in Fig. 1.

Referring to Fig. 13 there is shown a simplified circuit diagram illustrating the components of the present invention which contribute to maintain the deviation sensitivity constant despite changes in the frequency of the variable oscillator 24. There is shown generally in Fig. 13 the variable frequency oscillator 24 and the reactor circuit 26. The tuned circuit of oscillator 24 is composed of the coil 134 in series with a pair of parallel capacitors 128 and 122—124, a variable capacitor 120 and the variable capacitor 160. In addition there appears as capacity in this tuned circuit a capacitance generally designated by the numeral 190 which is in parallel with capacitance 160 and which includes the interelectrode capacitance of the oscillator tube 112 and the reactor tube 164 as well as the variable reactance effect of the reactor tube operation. Ordinarily the reactor tube 164 acts as a variable capacity and for this reason can be properly included in the capacitance 190.

As has been mentioned above, if the value of the capacitors 120, 160 and 190 remain constant, the deviation sensitivity increases with a decrease in the oscillator frequency of tube 112 in accordance with the law of inverse proportionality. In order to insure that the deviation sensitivity remains reasonably constant within the range of oscillator frequency covered by the variations of the main tuning capacitors 122—124, some compensation must be made in the value of capacitor 160. This is achieved in making capacitor 160 variable and mechanically ganging capacitor 160 to the main tuning capacitors 122—124.

Another feature of the circuit shown in Fig. 13 is the fact that capacitor 120 is made variable and is mechanically ganged with the main tuning capacitors 122—124 and the compensating capacitor 160. The radio frequency grid voltage of the oscillator tube 112 appears across capacitor 120 and accordingly capacitor 120 is adjusted to provide substantially constant amplitude of oscillations and thus insures still better uniformity of deviation sensitivity throughout the frequency range of oscillator 112. Since the impedance presented by a fixed capacitor changes the frequency, capacitor 120 is made variable and is ganged with the main tuning capacitors 122—124.

The capacitor 128 across the main tuning capacitors 122—124 is provided so that adjustment can be made in the capacitance presented by the tuning capacitors 122—124. This permits the use of a calibrated master dial, the main tuning capacitors being trimmed by capacitor 128 to align the capacitors with the master dial.

The modulated or unmodulated output from the variable oscillator 24 is fed to a piece of electronic equipment to be tested by means of an output radio frequency attenuator generally designated by the numeral 191 in Fig. 1. The attenuator includes in general a pick-up coil 192, one end of which is grounded as at 194 and the other end 196 of which is connected to the electronic equipment to be tested. Coil 192 is inductively coupled to the coil 134 in the tank circuit 24. An electrostatic shield 198 is provided to prevent excitation of the pick-up loop or coil 192 by capacity coupling. The pick-up coil 192 is positioned within a metal tube 200 so that the tube and coil operate on the inductive-coupling mode as a wave guide below cutoff.

A pick-up loop or monitor wire 202 is provided, the monitor wire extending into the tube 200 and being positioned between the pick-up loop 92 and the electrostatic shield 198. The position of monitor loop 202 is adjustable. A connection is made from the monitor loop 202 through a rectifier 204, a resistance 206, an inductance 208 and a second inductance 210 to a speaker. A capacitor 212 by-passes resistance 206 to ground.

Figure 7:
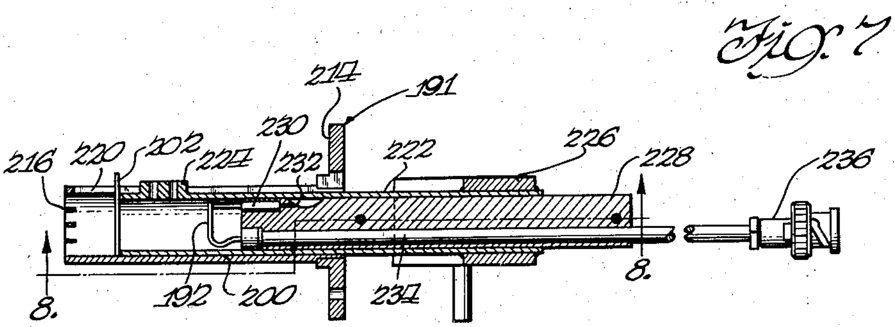
Fig. 7 is a view in vertical cross section through the radio frequency output attenuator which is shown schematically in Fig. 1.
Figure 8:
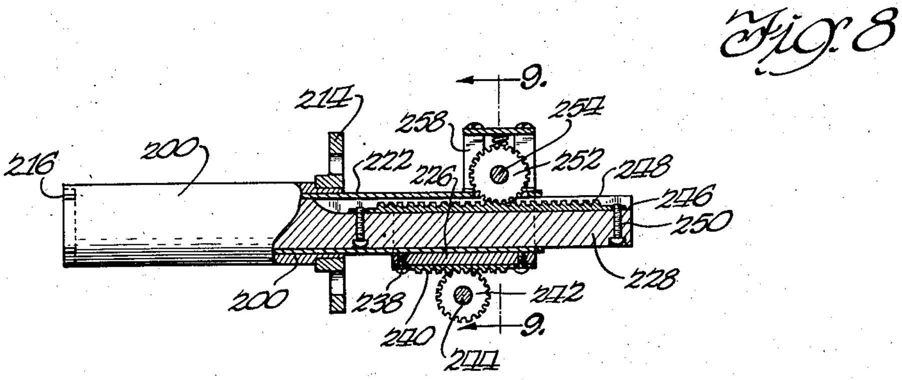
Fig. 8 is a view partially in cross section of the attenuator of Fig. 7 substantially as seen in the direction of the arrows along the line 8—8 of Fig. 7.
Figures 9, 11:
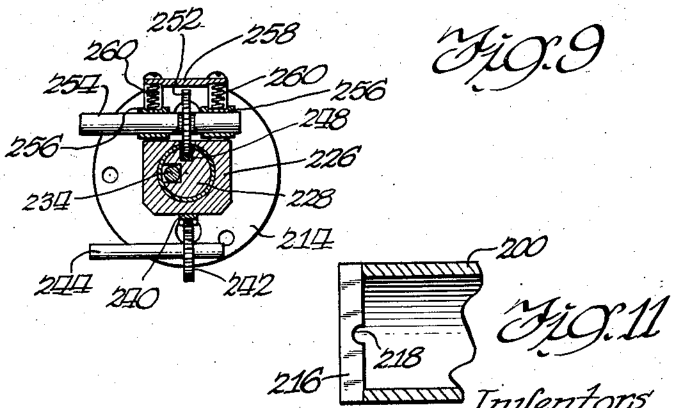
Fig. 9 is a view in vertical cross section of the attenuator of Figs. 7 and 8 substantially as seen in the direction of the arrows along the line 9—9 of Fig. 8.
Fig. 11 is an enlarged partial view in cross section substantially as seen in the direction of the arrows along the line 11—11 of Fig. 10 and illustrating the construction of the capacitive mode suppressor.
Figure 10:
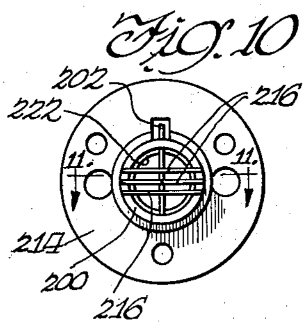
Fig. 10 is an end view of the attenuator of Fig. 7 as viewed from the left hand end in Fig. 7.

Referring now particularly to Figs. 7 through 11, a specific physical embodiment of the output R.F. attenuator 191 will be described in detail. The wave guide tube 200 is preferably circular in cross section and is open at both ends, one end being provided with an outturned attachment flange 214 which is used to attach the attenuator to the chassis of the signal generator. The other end of tube 200 has a plurality of slots formed therein which receive three flat pieces or straps of metal 216 which form the electrostatic shield 198. From Fig. 10 it will be seen that the straps 216 are disposed parallel with each other with the center strap lying along a diameter of tube 200. It will be further seen that the orientation of the straps 216 is in a plane perpendicular to the longitudinal axis of the monitor wire 202. The shape in plan view of the straps 216 is best seen in Fig. 11, the straps being substantially rectangular in shape but having a semicircular cut-out 218 along one of the longer edges thereof, the cut-out being along the edge positioned inwardly of tube 200 and being positioned about the longitudinal center line of tube 200.

The upper side of tube 200 as viewed in Fig. 7 has an elongated slot 220 formed therein through which monitor wire 202 extends. Monitor wire 202 is fixedly attached to the end of a second tube 222 whose external diameter is slightly less than the internal diameter of tube 200 whereby tube 222 slides easily within tube 200. An abutment member 224 positioned on tube 222 extends upwardly through slot 220 and serves to center tube 222 with respect to slot 220 and thus in turn centers the monitor wire 202. The other end of tube 202 carries a collar 226 fixedly attached thereto which includes the adjusting mechanism that will be described later.

Positioned within tube 222 and slidable therein is a substantially cylindrical plunger 228. The left hand end of plunger 228 as viewed in Fig. 7 has a longitudinal aperture therein which receives a resistor 230. One end of resistor 230 is attached to plunger 228 in a part-circular depression therein as at 232 and the other end of resistor 230 is connected to the pick-up loop 192. A longitudinal hole through plunger 228 receives a co-axial cable 234 which has the center lead therein attached to one end of the pick-up loop 192. The other end of the co-axial cable 234 is provided with the usual coupling 236.

In the actual installation the end of tube 200 carrying the electrostatic shield straps 216 is positioned adjacent the coil 134 in the tank of the variable frequency oscillator 24. It is desirable to adjust the radio frequency injection into the attenuator by moving the monitor wire 202 and the pick-up loop 192 toward and away from the shield and straps 216 and the coil 134. Also the value of the attenuation must be adjustable by moving the pick-up loop 192 toward and away from the monitor loop 202. To this end mechanism is provided for moving tube 222 inwardly and outwardly with respect to tube 200 which is ordinarily fixed and separate means is provided for moving plunger 228 inwardly and outwardly with respect to tube 222.

Referring to Figs. 8 and 9 the mechanism for procuring the desired movement of tube 222 and plunger 228 will be described in detail. The portion of tube 222 which normally extends outwardly and to the right with respect to flange 214 as viewed in Fig. 8 has attached thereto by means of screws 238 a geared rack 240. A gear 242 mounted on a shaft 244 is provided to engage with rack 240.

Shaft 244 is permanently positioned with respect to flange 214 and a rotary movement of shaft 244 and the attached gear 242 causes movement of tube 222 inwardly and outwardly with respect to tube 200. This accordingly adjusts the position of monitor wire 202 with respect to the tank coil 134, this adjusting motion being accomplished without affecting the attenuation between monitor wire 202 and pick-up loop 192.

The mechanism for moving plunger 228 with respect to tube 222 is mounted on the upper portion of member 226 as viewed in Figs. 8 and 9. A slot 246 is formed in plunger 228 at the right hand thereof as viewed in Fig. 8 and within the slot is mounted a geared rack 248 held in position by two screws 250. The highest point on the teeth of rack 248 is disposed well within the circumference of tube 228. A slot is formed at the right hand end of tube 222 and into this slot extends a toothed gear 252 which cooperates and meshes with the teeth on rack 248. Gear 252 is mounted on a rotating shaft 254 which is journaled in a pair of bearing blocks 256. In order to insure that there is no lost motion in the gear and rack arrangement, a frame 258 is provided that supports a pair of springs 260 that are under compression. The springs 260 press against the bearing blocks 256 and thus in turn press gear 252 against rack 248 to eliminate lost motion and inadvertent misadjustment therebetween.

The attenuator of Figs. 7 through 11 insures that only the desired excitation is obtained on pick-up loop 192, the desired excitation being that corresponding to the inductive coupling mode. This is obtained by providing the electrostatic shield 198 including the straps 216 between the coil 134 of the R.F. tank and the pick-up loop 192. Since the electrostatic shield 198 is immobile and since the monitor loop moves behind the shield, there is practically no mistuning of the main R.F. tank including coil 134 due to the variations of the position of the monitor loop 202. Furthermore, the amount of R.F. injection into the attenuator can be adjusted by turning shaft 244 without affecting the value of the attenuation and the value of the attenuation can be adjusted by turning shaft 254 thereby changing the distances between pick-up loop 192 and the monitor wire 202 without changing the R.F. injection into the attenuator.

Figure 14:
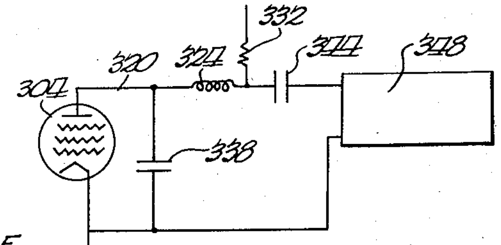
Fig. 14 is a simplified schematic diagram of the improved output attenuator illustrated in full in Fig. 12 of the drawings.

There is included in the signal generator of this invention an oscillator for generating precise and accurately controlled frequencies called intermediate or I.F. frequencies useful in calibrating and aligning certain types of radio frequency receivers. The circuit of the I.F. section of the signal generator of this invention is illustrated in Figs. 12 and 14 of the drawings.

Figure 12:
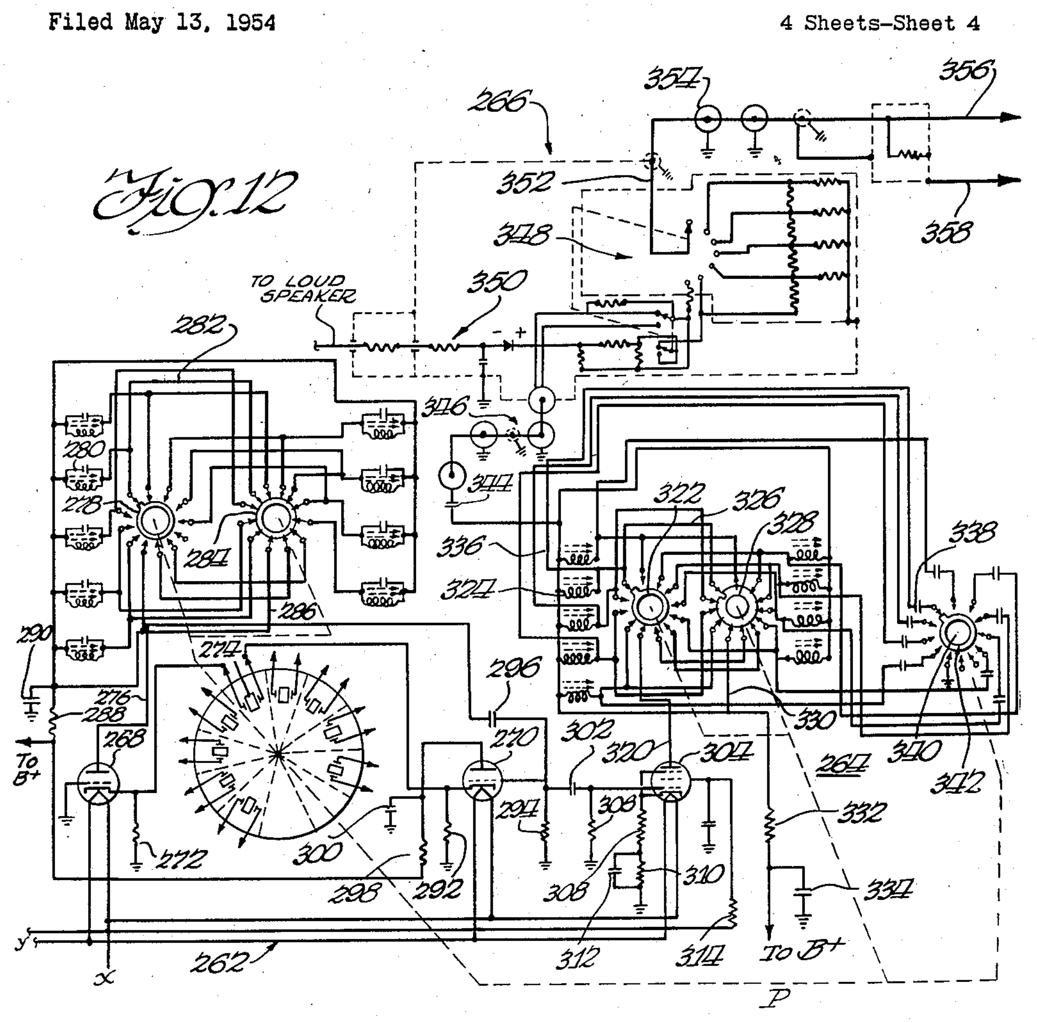
Fig. 12 is a schematic electrical circuit diagram of an intermediate frequency generator circuit incorporating therein an improved output attenuator circuit.

Referring particularly to Fig. 12 of the drawings, there is shown an I.F. section including an I.F. signal oscillator generally designated by numeral 262, an I.F. amplifier 264 and an output attenuator 266. These circuit components are arranged so that a plurality of discrete I.F. frequencies, for example nine separate and calibrated I.F. frequencies, can be calibrated, amplified and fed to the output attenuator for use in alignment and other operations.

The oscillator section 262 includes a pair of oscillator tubes 268 and 270 which are preferably 6C4's. Each of the tubes 268 and 270 is provided with a heater element that is supplied through lines marked X and Y from the main power supply 66 shown in Fig. 1 of the drawings. The cathode of tube 268 is connected to ground through a resistor 272 (270 ohms) and to one terminal of a crystal 274. It is to be understood that nine crystals 274 are provided so that by suitable switching of circuit connections nine separate and accurate I.F. frequencies are to be calibrated. For the sake of simplicity in the drawings only one crystal has been provided with an identifying numeral, it being understood that the other crystals operate and are connected in a like manner by a suitable switching arrangement. The grid of tube 268 is grounded and the plate is connected through a line 276 to a switch section 278 which in turn connects to an L.C. circuit 280. A plurality of L.C. circuits 280 is provided, the number of such circuits corresponding to the number of crystals 274 and being switchable into appropriate circuit connection therewith. Since the operation of each L.C. circuit 280 is identical, only one has been supplied with a reference numeral for the purpose of simplicity. The contact on switch 278 also is connected through a line 282 to another switch section 284 which is connected through a line 286 and a resistor 288 (1000 ohms) to the regulated high voltage supply appearing on arm 108 of resistor 106. Resistor 288 is by-passed to ground by a capacitor 290 (5000 $\mu\mu f.$). It is through the above described circuit that suitable operating potential on the plate of oscillator tube 268 is obtained.

The cathode of oscillator tube 270 is connected to ground through a resistance 292 (270 ohms) and to the other terminal of crystal 274. The control grid of tube 270 is connected first to ground through a resistor 294 (47,000 ohms) and through a capacitor 296 (470 $\mu\mu$f.) to the plate of tube 268. The plate of tube 270 is connected through a resistance 298 (1000 ohms) to the regulated source of high voltage operating potential appearing on arm 108 (see Fig. 1). A by-pass capacitor 300 (5000 $\mu\mu$f.) is connected from the plate of tube 270 to ground.

The two tubes 268 and 270 together with their circuit elements described above constitute a radio frequency oscillator suitable for producing an accurate and controlled I.F. frequency.

The output of the oscillator 262 is fed from the grid of tube 270 through a coupling capacitor 302 (470 $\mu\mu$f.) to the control grid of a tube 304 which serves as the I.F. amplifier. The input on the control grid of tube 304 is developed across a resistance 306 (68,000 ohms) connected with ground. Tube 304 is preferably a pentode, a suitable type being a 6AK6.

The heater of tube 304 is supplied with operating potential from the lines marked X and Y. The third or suppressor grid is connected directly to the cathode and the cathode is connected to a resistance 308 (68 ohms) in series with another resistor 310 (150 ohms). A capacitor 312 (5000 $\mu\mu$f.) in parallel with resistor 130 provides self-bias for tube 304. The screen grid of tube 304 is connected through a resistor 314 (1000 ohms) to the contact arm 316 of an adjustable resistor 138 (10,000 ohms) positioned in parallel with the regulator tube 110 (see Fig. 1). The resistor 318 and its contact arm 316 provide an adjutable voltage supply for the screen grid of tube 304 whereby to provide an adjustment for the level of output from the I.F. amplifier 264.

The plate of tube 304 is connected through a line 320 to one switch section 322 which in turn connects with an inductance 324. The contact on switch section 322 also is connected by means of a line 326 to a switch section 328 which is connected through a line 330 and a resistor 332 (1000 ohms) to the unregulated high potential output appearing on line 102 connected to the power supply 66 (see Fig. 1). This point of connection is by-passed to ground by a capacitor 234 (5000 $\mu\mu$f.).

The switch contact on switch section 332 is also connected through a line 336 to a capacitor 338 and to a contact on the switch section 340. The other contact on switch 342 is grounded. A plurality of coils 334 is provided, a separate coil being provided for each different I.F. frequency, and a corresponding capacitor 338 is provided for each coil 324. Since the function and operation of all of the coils 324 and all of the capacitor 338 is identical, only one of the coils and one of the capacitors has a reference numeral applied thereto for purposes of simplicity.

All of the switch sections 278, 284, 322, 238 and 340 as well as the mounting for the crystal 274 are ganged together so that suitable circuit connections are automatically made when switching from one I.F. frequency to another.

The other end of the coil 324 is also connected to resistor 332. It is from this last mentioned end of coil 324 that the output from the I.F. amplifier is taken through a coupling capacitor 344 (.05 $\mu$f.) to a coaxial line generally designated by the numeral 346. The coaxial line 346 connects with an attenuator circuit generally designated by the numeral 348 and a monitor circuit generally designated by the numeral 350. The output from the attenuator 348 is taken through a lead 352 to another coaxial cable 354 and from thence to a pair of output leads 356—358.

An essential point of novelty of the circuit illustrated in Fig. 12 is the incorporation therein of the attenuator in series with the elements of the output tuned circuit of the I.F. amplifier 264, the tuned circuit including coil 324 and capacitor 338. This feature is best illustrated in Fig. 14 which is a simplified circuit diagram of this improved output circuit.

It will be seen from Fig. 14 that the inductance 324, the capacitance 344, the attenuator 348 and the main final stage capacitor 338 are all in series circuit. By this arrangement proper matching to the low impedance of the attenuator can be achieved even though the specific values of the inductance 324 and the capacitor 328 must be changed when switching from one I.F. frequency to another. It will be seen therefore that this circuit provides an apparatus having stepwise changing of the principal inductance and capacitance in which the matching of the output attenuator to the final I.F. amplifier 304 is obtained despite the change of the principal inductance and capacitance elements. This is achieved without sacrifice of harmonic rejection since the output circuit in tube 304 is still highly tuned to the I.F. frequency being calibrated.

It will be seen that there has been provided a signal generator fulfilling all of the advantages and objects set forth above. Although certain specific examples and values of the circuit elements have been given for purposes of illustration, it is to be understood that various changes can be made therein without departing from the spirit and scope of the invention. Accordingly the invention is to be limited only as set forth in the following claims.

We claim:

1. In a frequency modulating circuit, the combination comprising a reactor tube, an oscillator tube connected in parallel with said reactor tube, an adjustable tuned circuit including an inductance and capacitance and a compensating impedance connected in series circuit and adjustable to a plurality of operating frequencies, said compensating impedance being connected in parallel circuit with said oscillator tube and said reactor tube, said oscillator tube and said tuned circuit forming a variable radio frequency oscillator, the reactance of said reactor tube being reflected into the tuned circuit of said oscillator circuit and being variable in accordance with the operating frequency of said oscillator circuit, and means to change the value of said compensating impedance when the frequency of said variable frequency oscillator circuit is changed thereby maintaining constant deviation sensitivity in the operation of said reactor tube.

2. In a frequency modulating circuit, the combination comprising a reactor tube, an oscillator tube having an anode and a cathode connected in parallel with said reactor tube, a tuned circuit including an inductance and a variable capacitance and a compensating capacitance connected in series, said compensating capacitance being connected between the anode and the cathode of said oscillator tube parallel thereto and to said reactor tube, said oscillator tube and said tuned circuit forming a variable radio frequency oscillator, the reactance of said reactor tube being reflected into said tuned circuit and being variable in accordance with the operating frequency of said tuned circuit, and means interconnecting said compensating capacitance and said variable capacitance to increase the value of said compensating capacitance when the frequency of said variable frequency oscillator circuit is lowered thereby maintaining constant deviation sensitivity in the operation of said reactor tube.

3. In a frequency modulating circuit, the combination comprising a reactor tube, an oscillator tube connected in parallel with said reactor tube, said oscillator tube including an anode and a cathode and a control grid, an adjustable tuned circuit including an inductance and a capacitance and a variable impedance connected in series circuit and adjustable to a plurality of operating frequencies connected in a circuit with said oscillator tube to form a variable radio frequency oscillator, said variable impedance being connected between said control grid and said cathode across which the signal of said control grid is developed, the reactance of said reactor tube being reflected into the tuned circuit of said oscillator circuit and being variable in accordance with the operating frequency of said oscillator circuit, and means to maintain the impedance of said variable impedance constant when the frequency of said variable frequency oscillator circuit is changed thereby maintaining constant deviation sensitivity in the operation of said reactor tube.

4. In a frequency modulating circuit, the combination comprising a reactor tube, an oscillator tube connected in parallel with said reactor tube, said oscillator tube including an anode and a cathode and a control grid, an adjustable tuned circuit including an inductance and a main tuning capacitance and a first variable capacitor and a second variable capacitor connected in series circuit and adjustable to a plurality of operating frequencies, said first variable capacitor being connected in parallel circuit with said oscillator tube and said reactor tube, said oscillator tube and said tuned circuit forming a variable radio frequency oscillator, said second variable capacitor being connected between said control grid and said cathode across which the signal for said control grid is developed, the reactance of said reactor tube being reflected into the tuned circuit of said oscillator circuit and being variable in accordance with the operating frequency of said oscillator circuit, and means to increase the value of said first variable capacitor and to change the impedance of said second variable capacitor to maintain the impedance of said second variable capacitor constant when the frequency of said variable frequency oscillator circuit is lowered thereby maintaining constant deviation sensitivity in the operation of said reactor tube.

5. In a frequency modulating circuit, the combination comprising a reactor tube, an oscillator tube connected in parallel with said reactor tube, said oscillator tube including an anode and a cathode and a control grid, a tuned circuit comprising an inductance and a main tuning capacitance and a first variable capacitor and a second variable capacitor connected in a closed series circuit, the junction between said second variable capacitor and said inductance being connected to said anode and the junction of said first variable capacitor and said second variable capacitor being connected to said cathode, the junction between said first variable capacitor and said main tuning capacitance being connected to said control grid, the reactance of said reactor tube being reflected into the tuned circuit of said oscillator circuit and being variable in accordance with the operating frequency of said oscillator circuit, and means interconnecting said main tuning capacitor and said first and second variable capacitors to change the value of said first variable capacitor to provide a constant impedance between the control grid and cathode of said oscillator tube and to increase the value of said second variable capacitor when the frequency of said tuned circuit is lowered whereby to maintain constant deviation sensitivity in the operation of said reactor tube.

6. In a frequency modulating circuit, the combination comprising a reactor tube having an anode and a cathode, a regulated high potential source connected to said anode, an unregulated heater for heating said cathode, a resistor connected between said cathode and electrical ground, the end of said resistor connected to said cathode being attached also through a second resistor to an unregulated high potential voltage supply, an oscillator tube connected in parallel with said reactor tube, an adjustable tuned circuit including an inductance and a capacitance and a compensating impedance connected in series circuit and adjustable to a plurality of operating frequencies, said compensating impedance being connected in parallel circuit with said oscillator tube and said reactor tube, said oscillator tube and said tuned circuit forming a variable radio frequency oscillator, the reactance of said reactor tube being reflected into the tuned circuit of said oscillator and being variable in accordance with the operating frequency of said oscillator, and means to change the value of said compensating impedance when the frequency of said variable frequency oscillator is changed thereby maintaining constant deviation sensitivity in the operation of said reactor tube.

7. In a frequency modulating circuit, the combination comprising a reactor tube having an anode and a cathode, a regulated high potential source connected to said anode, an unregulated heater for heating said cathode, a resistor connected between said cathode and electrical ground, the end of said resistor connected to said cathode being attached also through a second resistor to an unregulated high potential voltage supply, an oscillator tube connected in parallel with said reactor tube, said oscillator tube including an anode and a cathode and a control grid, an adjustable tuned circuit including an inductance and a capacitance and a variable impedance connected in series circuit and adjustable to a plurality of operating frequency connected in a circuit with said oscillator tube to form a variable radio frequency oscillator, said variable impedance being connected between the control grid of said oscillator tube and the cathode of said oscillator tube across which the signal of said control grid is developed, the reactance of said reactor tube being reflected into the tuned circuit of said oscillator and being variable in accordance with the operating frequency of said oscillator, and means to maintain the impedance of said variable impedance, constant when the frequency of said variable frequency oscillator is changed.

8. In a frequency modulating circuit, the combination comprising a reactor tube having an anode and a cathode, a regulated high potential source connected to said anode, an unregulated heater for heating said cathode, a resistor connected between said cathode and electrical ground, the end of said resistor connected to said cathode being attached also through a second resistor to an unregulated high potential voltage supply, an oscillator tube connected in parallel with said reactor tube, said oscillator tube including an anode and a cathode and a control grid, an adjustable tuned circuit including an inductance and a main tuning capacitance and a first variable capacitor and a second variable capacitor connected in series circuit and adjustable to a plurality of operating frequencies, said first variable capacitor being connected in parallel circuit with said oscillator tube and said reactor tube, said oscillator tube and said tuned circuit forming a variable radio frequency oscillator, said second variable capacitor being connected between the control grid of said oscillator tube and the cathode of said oscillator tube across which the signal for said control grid of said oscillator tube is developed, the reactance of said reactor tube being reflected into the tuned circuit of said oscillator and being variable in accordance with the operating frequency of said oscillator, and means to increase the value of said first variable capacitor and to change the value of said second variable capacitor to maintain the impedance of said second variable capacitor constant when the frequency of said variable frequency oscillator is lowered thereby maintaining constant deviation sensitivity in the operation of said reactor tube.

9. In a frequency modulating circuit, the combination comprising a reactor tube having an anode and a cathode, a regulated high potential source connected to said anode, an unregulated heater for heating said cathode, a first resistor connected between said cathode and electrical ground, the end of said first resistor connected to said cathode being attached also through a second adjustable resistor to an unregulated high potential voltage supply, said second resistor being adjustable to adjust the flow of current through said reactor tube, an oscillator tube connected in parallel with said reactor tube, said oscillator tube including an anode and a cathode and a control grid, a tuned circuit comprising an inductance and a main tuning capacitance and a first variable capacitor and a second variable capacitor connected in a closed series circuit, the junction between said second variable capacitor and said inductance being connected to the anode of said oscillator tube and the junction of said first variable capacitor and said second variable capacitor being connected to the cathode of said oscillator tube, the junction between said first variable capacitor and said main tuning capacitance being connected to the control grid of said oscillator tube, the reactance of said reactor tube being reflected into the tuned circuit of said oscillator and being variable in accordance with the operating frequency of said oscillator, and means interconnecting said main tuning capacitor and said first and second variable capacitors to change the value of said first variable capacitor to provide a constant impedance between the control grid and the cathode of said oscillator tube and to increase the value of said second variable capacitor when the frequency of said tuned circuit is lowered.

References Cited in the file of this patent

UNITED STATES PATENTS

| | | |
|---|---|---|
| 1,954,680 | Morack | Apr. 10, 1934 |
| 1,973,123 | Stogoff | Sept. 11, 1934 |
| 2,080,560 | Case | May 18, 1937 |
| 2,111,086 | Basim | Mar. 15, 1938 |
| 2,280,527 | Kimball | Apr. 21, 1942 |
| 2,355,338 | Stewart | Aug. 8, 1944 |
| 2,452,960 | Smith | Nov. 2, 1948 |
| 2,474,795 | Beuren | June 28, 1949 |
| 2,481,659 | Guanella | Sept. 13, 1949 |
| 2,486,005 | Clark | Oct. 25, 1949 |
| 2,511,673 | Lawrence | June 13, 1950 |
| 2,521,694 | Crosby | Sept. 12, 1950 |
| 2,557,110 | Jaynes | June 19, 1951 |
| 2,587,493 | Loughlin | Feb. 26, 1952 |
| 2,617,938 | Haner | Nov. 11, 1952 |
| 2,640,155 | Rambo | May 26, 1953 |
| 2,724,802 | Oschmann | Nov. 22, 1955 |